(No Model.)
R. T. REESE & D. WILLIAMS.
COMMODE.
No. 484,672. Patented Oct. 18, 1892.
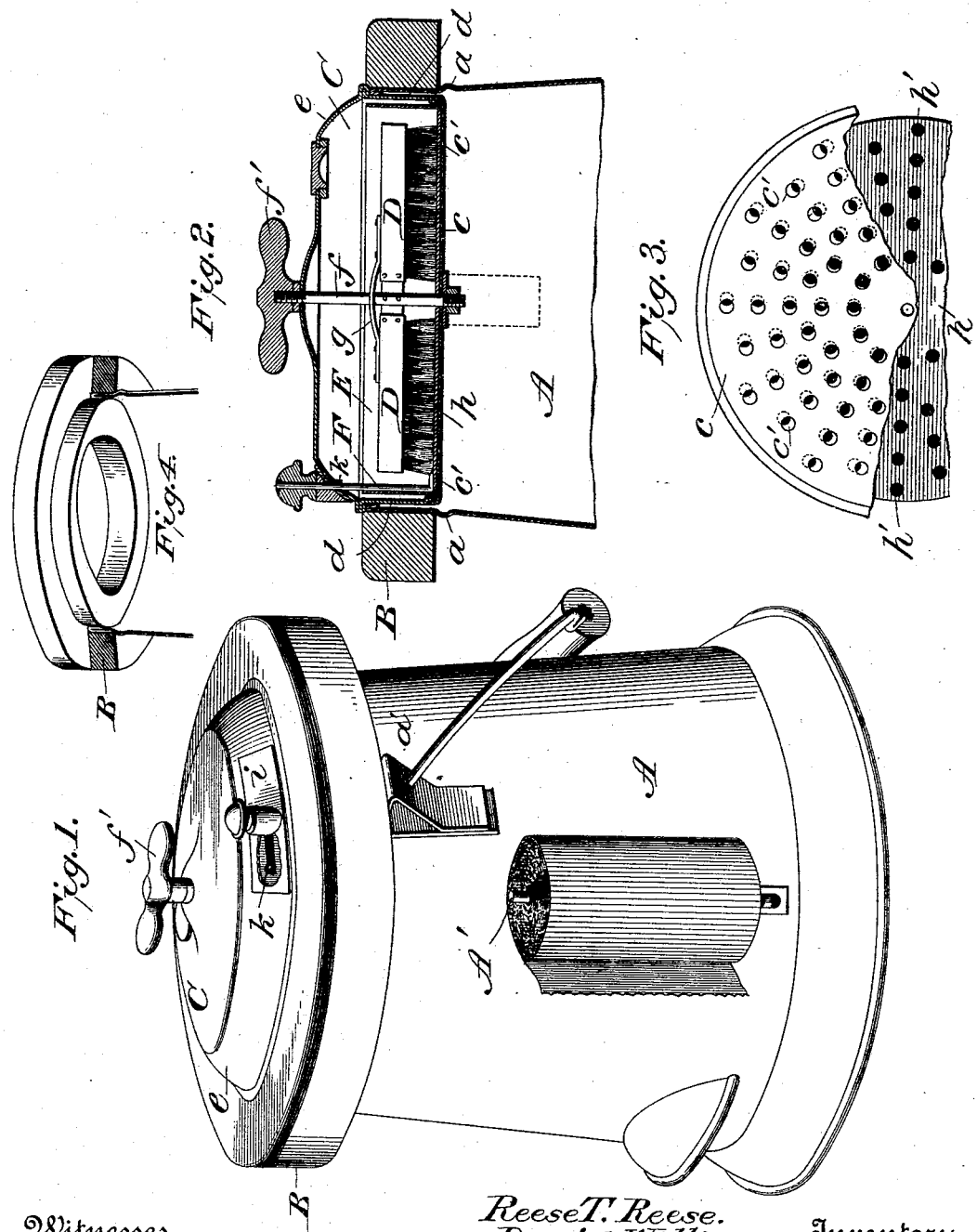
Witnesses
G. S. Elliott
E. W. Johnson
Reese T. Reese.
David Williams. Inventors:
by 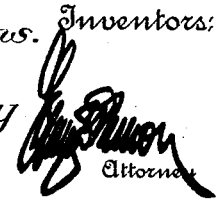
Attorney

UNITED STATES PATENT OFFICE.

REESE T. REESE AND DAVID WILLIAMS, OF SCRANTON, PENNSYLVANIA.

COMMODE.

SPECIFICATION forming part of Letters Patent No. 484,672, dated October 18, 1892.

Application filed May 14, 1892. Serial No. 433,045. (No model.)

*To all whom it may concern:*

Be it known that we, REESE T. REESE and DAVID WILLIAMS, citizens of the United States of America, residing at Scranton, in the county of Lackawanna and State of Pennsylvania, have invented certain new and useful Improvements in Commodes; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in disinfectant-covers for commodes.

The object of the invention is to provide an improved cover for commodes, which is adapted to receive disinfectant material, said cover comprising an apertured or perforated bottom, a receptacle having corresponding perforations secured thereto, so that it can be turned to cause the apertures therein to register with those in the bottom of the cover, and a brush which operates above the perforated bottom of the receptacle containing the disinfectant, said receptacle also having an arm which extends beyond the upper portion of the cover and is adapted to engage therewith, as will be hereinafter fully set forth, and particularly pointed out in the claims.

In the accompanying drawings, forming a part of this specification, Figure 1 is a perspective view of a commode, showing our improvements applied thereto. Fig. 2 is a vertical sectional view. Fig. 3 is a detail view of the bottom of the receptacle attached to the bottom of the cover. Fig. 4 is a detail perspective view of a seat, partly in section.

A designates the body portion of the commode, which is provided near its upper edge with an outwardly-projecting bead $a$ and with ears $a'$, each being made of a single piece and having an upper horizontal portion upon which is adapted to rest an annular rim B, and to these ears a swinging bail or handle is secured in the usual manner.

To one side of the commode is rigidly secured a pin A', which is bent upwardly to receive a roll of paper, as shown.

The rim B, resting upon the bead $a$ and ears, forms a seat when the article is in use and the cover C removed therefrom.

The cover C is practically a receptacle having a perforated or apertured bottom $c$, which is connected by a vertical wall $d$ to the top $e$, said top being struck up centrally, as shown, and apertured for the passage of a pin $f$, to the upper end of which is secured a handle $f'$. This pin carries or is attached to a block $g$, to which are secured brushes D D. The lower end of the pin passes through an aperture in the bottom of the cover and receives a nut.

E designates the receptacle for the disinfectant or deodorizer, the bottom plate $h$ of which rests upon the bottom of the cover and is provided with perforations $h'$, which register with the perforations $c'$, and this receptacle has an arm F, which extends without the cover and is provided with a slide $i$ and a knob, as shown. The arm passes through a slot in the top of the cover, said slot being formed by cutting away the metal and bending the upper edge in to form a bearing-surface for the rod, which bears against the same by spring-pressure. Each end of the slot has a recess $k$, into which the rod enters at the limit of its movement, so as to more securely hold the receptacle for the disinfectant when it is opened or closed, and by being so held it will be better able to resist the movement of the brushes which pass over the bottom of the same. The cover has an aperture closed by a plug, and through this aperture the disinfectant is passed to the receptacle E. It will be noted that the apertures $h'$ in the bottom of the receptacle for the disinfectant and the apertures $c'$ in the bottom of the cover correspond, so that when the receptacle is partially turned the apertures near the center will register to a greater extent than those near the rim, so that when the receptacle is turned a larger portion of the disinfectant will fall adjacent to the center of the vessel, and by turning the brushes it will be sifted over the entire bottom. It will be seen that by this construction the greater part of the disinfectant is placed near the center, where it is required, after which an equal distribution takes place.

In Fig. 4 of the drawings we have shown a seat attachment for the commode, which is provided with a central opening and a projecting flange which laps over the upper edge of the commode and rests upon the rim B. This seat is intended for use when the vessel is to be used by children.

By the construction hereinbefore described it will be noted that the disinfectant is held by a separate receptacle within the cover, so that said disinfectant material will not be liable to clog or fill up the space between the receptacle and the vertical rim of the cover.

Having thus described our invention, what we claim as new, and desire to secure by Letters Patent, is—

1. In a commode, the combination of a cover consisting of a top and bottom portion, the bottom portion being perforated, a receptacle adapted to contain disinfectant, located within the cover and pivotally secured thereto by a central pin $f$, said pin extending beyond the top of the cover and provided with a turning-handle, brushes carried by said pin, so as to come in contact with the base of the receptacle, and an arm rigidly attached to the cover, said arm passing through an aperture in the top of the cover, the parts being organized substantially as shown, and for the purpose set forth.

2. The combination, in a cover for commodes, of a receptacle having a perforated bottom, a receptacle adapted to contain disinfectant material, located within the cover, said receptacle being pivotally attached to the cover and provided with an operating-bar which extends through an aperture in the cover to one side of the pivot, substantially as shown, and for the purpose set forth.

3. The combination, with a commode, of a cover adapted to hold disinfectant material, said cover having a perforated bottom, a receptacle E, located within the cover and provided with a correspondingly-perforated bottom and upwardly-projecting side walls, an operating-bar attached to the periphery of the receptacle, said bar passing through the top and provided with a grasping-knob for moving the bar and receptacle to cause the perforations in the receptacle and bottom of the cover to register, a brush or agitator mounted on the pin which serves as a pivot for the receptacle, said pivot extending beyond the top of the cover and provided with means for turning the same, the parts being organized substantially as shown, and for the purpose set forth.

4. The combination, with a hollow cover provided with a perforated bottom $c$, the upper part of said cover having a slot one edge of which is bent in, of a recess or notch $k$ at each end of the slot, and a bar F, carried by the disinfectant-receptacle contained within the hollow cover, substantially as shown, and for the purpose set forth.

5. In combination with a hollow cover having a perforated bottom and a top with a slot, a disinfectant-receptacle pivotally secured within said cover and provided with a rod F, said rod passing through the slot in the cover and carrying a slide $i$, substantially as shown, and for the purpose set forth.

In testimony whereof we affix our signatures in presence of two witnesses.

REESE T. REESE.
DAVID WILLIAMS.

Witnesses:
B. G. MORGAN,
RAY. W. MORGAN.